(12) United States Patent
Yang et al.

(10) Patent No.: US 7,290,412 B2
(45) Date of Patent: Nov. 6, 2007

(54) WASHING MACHINE

(75) Inventors: Byoung Yull Yang, Ansan-Si (KR); Hyung Gyoon Kim, Suwon-Si (KR); Sang Yeon Pyo, Suwon-Si (KR); Seon-Woo Park, Suwon-Si (KR); Hye Soon Yang, Yongin-Si (KR); Seong Min Oak, Masan (KR); Seung Ju Choi, Suwon-Si (KR); Jae-Ryong Park, Suwon-Si (KR); Hyun Sook Kim, Suwon-Si (KR)

(73) Assignee: Samsung Electronics Co., Ltd., Suwon (KR)

( * ) Notice: Subject to any disclaimer, the term of this patent is extended or adjusted under 35 U.S.C. 154(b) by 463 days.

(21) Appl. No.: 10/890,220

(22) Filed: Jul. 14, 2004

(65) Prior Publication Data

US 2005/0132756 A1    Jun. 23, 2005

(30) Foreign Application Priority Data

Dec. 23, 2003    (KR) ...................... 10-2003-0095534

(51) Int. Cl.
*D06F 39/02* (2006.01)

(52) U.S. Cl. .......................................... 68/5 C; 68/15
(58) Field of Classification Search ................ 134/105, 134/108; 68/15, 5 C
See application file for complete search history.

(56) References Cited

U.S. PATENT DOCUMENTS

| | | | | | |
|---|---|---|---|---|---|
| 1,501,746 | A | * | 7/1924 | Carter | 68/139 |
| 1,852,179 | A | * | 4/1932 | McDonald | 68/183 |
| 1,946,278 | A | * | 2/1934 | Elfving | 68/192 |
| 2,562,842 | A | * | 7/1951 | Cushman | 81/3.56 |
| 3,203,013 | A | * | 8/1965 | Buss | 8/158 |
| 3,310,039 | A | * | 3/1967 | Holt | 122/504 |
| 3,443,406 | A | * | 5/1969 | Hornback et al. | 68/58 |
| 3,583,181 | A | * | 6/1971 | Brillet | 68/18 F |
| 3,730,682 | A | * | 5/1973 | Brubaker | 422/28 |
| 3,940,058 | A | * | 2/1976 | Norris | 237/9 R |
| 4,439,655 | A | * | 3/1984 | Borter | 200/345 |
| 4,480,173 | A | * | 10/1984 | Butterfield | 392/401 |
| 4,527,343 | A | * | 7/1985 | Danneberg | 34/452 |

(Continued)

FOREIGN PATENT DOCUMENTS

DE          2 544 054        *   4/1977

(Continued)

*Primary Examiner*—Frankie L. Stinson
(74) *Attorney, Agent, or Firm*—Sughrue Mion, PLLC

(57) ABSTRACT

A washing machine in which steam and hot water are supplied to heat wash water. The washing machine includes a water tub for containing wash water, a steam generating unit for heating water supplied thereto, thereby generating steam, a water supply unit for supplying water into the water tub and the steam generating unit, a steam supply unit for supplying the steam generated from the steam generating unit into the water tub, and a hot water supply unit for supplying hot water from the steam generating unit into the water tub. In the washing machine, the temperature of wash water can be rapidly increased in accordance with steam and hot water supplied into the water tub. Accordingly, it is possible to reduce the overall wash time while reducing the amount of wash water to be used. The energy consumed to heat the wash water can also be reduced.

14 Claims, 2 Drawing Sheets

U.S. PATENT DOCUMENTS 5,219,371 A * 6/1993 Shim et al. .................. 8/149.1
6,585,781 B1 * 7/2003 Roseen ..................... 8/149.1

FOREIGN PATENT DOCUMENTS

| DE | 32 44 363 | * | 6/1984 |
| EP | 1 275 767 A1 | | 1/2003 |
| EP | 1 544 345 A2 | | 6/2005 |
| GB | 442 976 A | | 2/1936 |
| JP | 62-93931 U | | 6/1987 |
| JP | 4-158896 | * | 6/1992 |
| JP | 11-226290 A | | 8/1999 |
| JP | 2000-176192 | | 6/2000 |
| JP | 2003-019382 | | 1/2003 |
| JP | 2003-093775 | | 4/2003 |
| JP | 2003-311084 A | | 11/2003 |

* cited by examiner

WASHING MACHINE

CROSS-REFERENCE TO RELATED APPLICATION

This application claims the benefit of Korean Patent Application No. 2003-95534, filed on Dec. 23, 2003 in the Korean Intellectual Property Office, the disclosure of which is incorporated herein by reference.

BACKGROUND OF THE INVENTION

1. Field of the Invention

An apparatus consistent with the present invention relates to a washing machine and, more particularly, to a washing machine in which steam and hot water are supplied into a washing tub, so as to rapidly increase the temperature of wash water.

2. Description of the Related Art

Drum type washing machines generally perform a laundry washing process through operations thereof for raising laundry, together with wash water, along a cylindrical rotating drum containing the laundry and wash water, and subsequently dropping the laundry and wash water, during rotation of the cylindrical rotating drum. An example of such a drum type washing machine is disclosed in Japanese Patent Laid-open Publication No. 2001-149685. This drum type washing machine is configured to perform a washing process using heated wash water.

The disclosed drum type washing machine includes a water tub for containing wash water, a rotating drum rotatably mounted in the water tub, and provided with through-holes for spin-drying at a peripheral wall thereof, and a heater for heating the wash water contained in the water tub. In a wash cycle of the drum type washing machine, washing of laundry is carried out as the rotating drum rotates within the water tub at a relatively low speed under the condition in which wash water and detergent have been supplied into the water tub. In order effectively to wash the laundry, the wash water is used in the wash cycle in a state of being heated by the heater.

However, such a conventional washing machine has a problem in that a great deal of time is required to heat the wash water to a desired wash temperature because a large amount of wash water supplied into the water tub is heated entirely by the heater, which is disposed at the bottom of the water tub, so that the overall wash time is increased.

Furthermore, the conventional washing machine involves a waste of wash water because the wash water fills even a heater case installed at the bottom of the water tub. Waste of energy is also caused by the fact that it is necessary to heat the water contained in the heater case.

SUMMARY OF THE INVENTION

Illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above.

Therefore, consistent with the present invention, a washing machine is provided in which steam and hot water are supplied into a water tub, so as to rapidly raise the temperature of wash water, thereby being capable of reducing the total wash time while reducing the amount of wash water to be used, and reducing the consumption of energy caused by heating of the wash water.

In accordance with one aspect, the present invention provides a washing machine comprising: a water tub for containing wash water; a steam generating unit which heats water supplied thereto, thereby generating steam; a water supply unit which supplies water into the water tub and the steam generating unit; a steam supply unit which supplies the steam generated from the steam generating unit into the water tub; and a hot water supply unit which supplies hot water from the steam generating unit into the water tub.

The steam generating unit may comprise a heating tank having a sealed container structure to contain a predetermined amount of water, while being connected to the water, steam and hot water supply units, and a heater which heats the water contained in the heating tank.

The steam generating unit may further comprise a water level sensor which senses a water level in the heating tank, a temperature sensor which senses an internal temperature of the heating tank, and a pressure sensor which senses an internal pressure of the heating tank.

The water supply unit may comprise a first water supply pipe for supplying water into the water tub, a first water supply valve for controlling the supply of water of the first water supply pipe, a second water supply pipe for supplying water into the heating tank, and a second water supply valve for controlling the supply of water of the second water supply pipe.

A detergent supply unit adapted to contain detergent to be supplied may be arranged at a portion of the first water supply pipe such that the detergent contained therein is supplied along with the water supplied through the first water supply pipe.

The steam supply unit may comprise a steam supply pipe for guiding the steam from the heating tank into the water tub, and a steam supply valve for controlling supply of the steam into the steam supply pipe.

The steam supply pipe may extend into the heating tank such that an inlet thereof is positioned at an upper portion of the heating tank, inside the heating tank.

The hot water supply unit may comprise a hot water supply pipe for guiding hot water from the heating tank into the water tub, and a hot water supply valve for controlling supply of the hot water into the hot water supply pipe.

The washing machine may further comprise a rotating drum rotatably mounted in the water tub while having, at a front wall thereof, an access opening to be forwardly opened, the rotating drum being provided, at a peripheral wall thereof, with a plurality of through-holes, and a driving unit for driving the rotating drum.

In accordance with another aspect, the present invention provides a washing machine comprising: a water tub for containing wash water; a steam generating unit which heats water supplied thereto, thereby generating steam and hot water, the steam generating unit including a heating tank for containing a predetermined amount of water, and a heater for heating the water contained in the heating tank; a water supply unit which supplies water into the water tub and the heating tank; a hot water supply pipe which guides hot water from the heating tank into the water tub; a hot water supply valve which opens and closes the hot water supply pipe; a steam supply unit which guides the steam from the steam generating unit into the water tub; and a steam supply valve which opens and closes the steam supply pipe.

BRIEF DESCRIPTION OF THE DRAWINGS

The above aspects, and other features and advantages of illustrative, non-limiting embodiments of the present invention will become more apparent after reading the following detailed description when taken in conjunction with the drawings, in which.

DETAILED DESCRIPTION OF ILLUSTRATIVE, NON-LIMITING EMBODIMENTS OF THE INVENTION

Illustrative, non-limiting embodiments of the present invention will now be described in detail with reference to the accompanying drawings.

Figure 1:
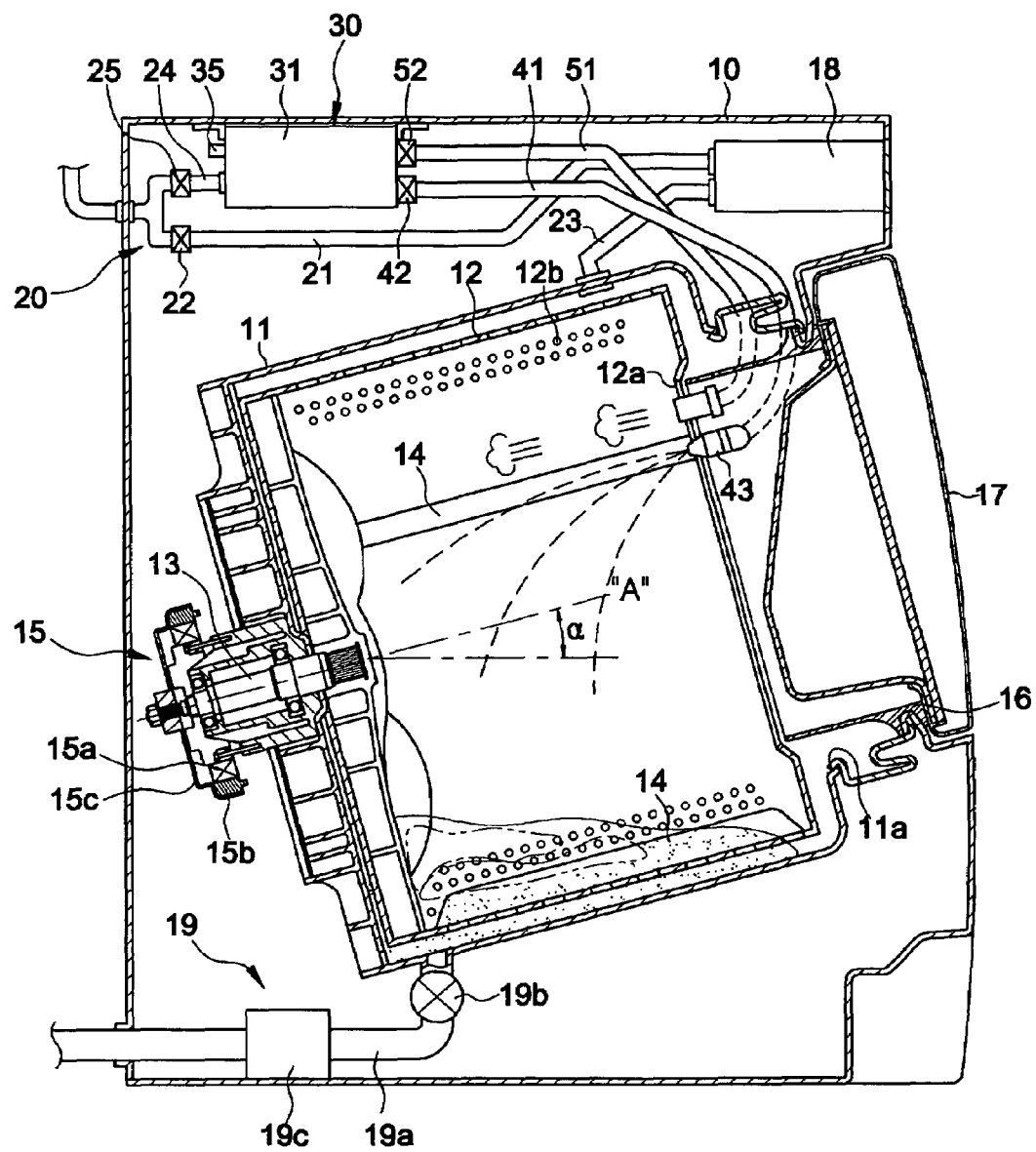
FIG. 1 is a sectional view illustrating the overall configuration of a washing machine according to an exemplary embodiment of the present invention.

Referring to FIG. 1, a washing machine, to which the present invention is applied, is illustrated. As shown in FIG. 1, this washing machine is a drum type washing machine including a housing 10, a drum-shaped water tub 11 mounted in the housing 10, and adapted to contain wash water, and a rotating drum 12 rotatably mounted in the water tub 11.

The water tub 11 in the housing 10 is inclined at a certain angle α with respect to an installation surface, on which the washing machine is installed, such that its front wall provided with an access opening 11a is positioned at a level higher than that of its rear wall. The rotating drum 12, which is mounted in the water tub 11, is inclinedly arranged with respect to the installation surface in the same fashion as that of the water tub 11 such that its front wall provided with an access opening 12a is positioned at a level higher than that of its rear wall. That is, the rotating drum 12 is arranged such that its rotation axis, that is, its center line A, is inclined at the angle α with respect to the installation surface, so as to cause its front wall provided with the access opening 12a to be forwardly and upwardly directed. A rotating shaft 13 is fixedly mounted, at one end thereof, to a central portion of the rear wall of the rotating drum 12 inside the rotating drum 12. The rotating shaft 13 is also rotatably supported by a central portion of the rear wall of the water tub 11. Accordingly, the rotating drum 12 is rotatable within the water tub 11. A plurality of through-holes 12b are formed at a peripheral wall of the rotating drum 12. A plurality of lifters 14 are mounted on an inner peripheral surface of the rotating drum 12, so as to raise laundry in the rotating drum 12, and then to release the raised laundry, thereby causing the laundry to be dropped, during rotation of the rotating drum 12.

A driving unit, such as, for example, a motor 15, is mounted to the rear wall of the water tub 11 outside the water tub 11, so as to rotate the rotating shaft 13 mounted to the rotating drum 12. The motor 15 includes a stator 15a fixed to the rear wall of the water tub 11, a rotor 15b rotatably arranged around the stator 15a, and a rotating plate 15c connecting the rotor 15b to the rotating shaft 13. An access opening 16 is formed at a front wall of the housing 10. The access opening 16 is aligned with the access openings 11a and 12a respectively formed at the water tub 11 and rotating drum 12, so as to allow the user to put laundry into the rotating drum 12 and to take laundry out of the rotating drum 12. Mounted to the access opening 16 is a door 17 adapted to open and close the access opening 16.

Arranged at an upper portion of the water tub 11 are a detergent supply unit 18 for supplying detergent into the water tub 11, a steam generating unit 30 for generating steam and hot water, steam and hot water supply units for supplying the steam and hot water generated from the steam generating unit 30 into the water tub 11, and a water supply unit 20 for supplying water into both the water tub 11 and the steam generating unit 30. A drainage unit 19 is mounted at a lower portion of the water tub 11 in order to drain water from the water tub 11. The drainage unit 19 includes a drainage pipe 19a, a drainage valve 19b, and a drainage motor 19c.

The detergent supply unit 18 is defined therein with a chamber for receiving detergent. In order to allow the user to easily put detergent into the chamber, the detergent supply unit 18 is arranged at the front wall of the housing 10. The water supply unit 20 includes a first water supply pipe 21 for supplying water toward the water tub 11, and a first water supply valve 22 arranged in the first water supply pipe 21 to control the supply of water to the first water supply pipe 21. The first water supply pipe 21 is connected to the detergent supply unit 18 in order to supply water from an external water supply source to the detergent supply unit 18. A separate connecting pipe 23 is connected between the detergent supply unit 18 and the water tub 11, in order to feed water emerging from the detergent supply unit 18 into the water tub 11. As water is introduced into the water tub 11 via the detergent supply unit 18, the detergent contained in the detergent supply unit 18 can be supplied to the water tub 11 in a state of being dissolved in the water. For supply of water to the steam generating unit 30, in addition to the supply of water to the detergent supply unit 18, the water supply unit 20 also includes a second water supply pipe 24, and a second water supply valve 25 arranged in the second water supply pipe 24 to control the supply of water to the steam generating unit 30.

Figure 2:
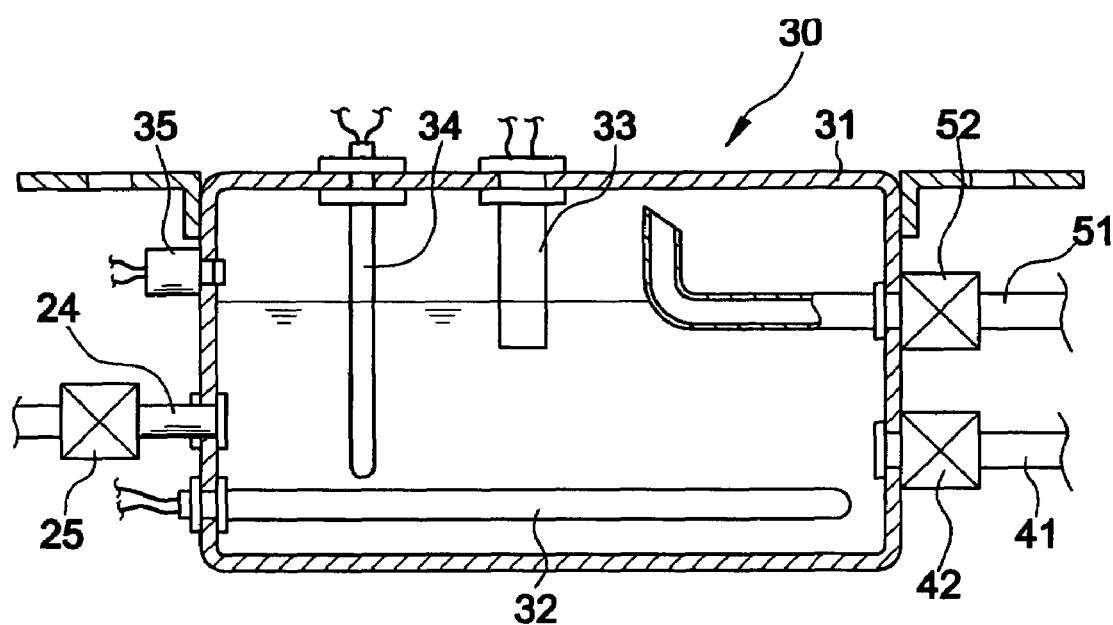
FIG. 2 is sectional view illustrating a steam generating unit included in the washing machine according to the exemplary embodiment of the present invention.

As shown in FIG. 2, the steam generating unit 30 includes a heating tank 31 having a sealed container structure to receive a certain amount of water, and a heater 32 for heating the water received in the heating tank 31, thereby generating steam and hot water. The steam generating unit 30 also includes a water level sensor 33 for controlling the level of water in the heating tank 31, a temperature sensor 34 for controlling the internal temperature of the heating tank 31, and a pressure sensor 35 for controlling the internal pressure of the heating tank 31.

The heater 32 is arranged at a lower portion of the heating tank 31 inside the heating tank 31 such that it is dipped in the water received in the heating tank 31. The second water supply pipe 24 is connected to the heating tank 31 at one side of the heating tank 31, in order to supply water into the heating tank 31. At the other side of the heating tank 31, the steam and hot water supply units are connected to the heating tank 31, in order to supply steam and hot water to the water tub 11.

As shown in FIGS. 1 and 2, the hot water supply unit includes a hot water supply pipe 41 connected between the lower portion of the heating tank 31 and the access opening 12a of the rotating drum 12 to guide hot water from the heating tank 31 to the water tub 11 via the rotating drum 12, and a hot water supply valve 42 arranged in the hot water supply pipe 41 to control the supply of hot water through the hot water supply pipe 41. The hot water supply pipe 41 is connected, at an inlet thereof, to a side wall of the heating tank 31 at the lower portion of the heating tank 31. A hot water injection nozzle 43 is mounted to an outlet of the hot water supply pipe 41 in order to inject hot water from the hot water supply pipe 41 onto laundry contained in the rotating drum 12. With this configuration, the hot water supply unit can supply, into the rotating drum 12, hot water produced through a water heating operation of the heater 32 installed in the heating tank 31.

The steam supply unit includes a steam supply pipe 51 connected between an upper portion of the heating tank 31 and the access opening 12a of the rotating drum 12 to guide steam from the heating tank 31 to the water tub 11 via the rotating drum 12, and a steam supply valve 52 arranged in the steam supply pipe 51 to control the supply of steam through the steam supply pipe 51. In order to receive only steam from the interior of the heating tank 31, the steam supply pipe 51 extends horizontally into the interior of the heating tank 31 at the side wall of the heating tank 31, and is then bent to extend upwardly in the heating tank 31 so that its inlet is positioned at an upper portion of the heating tank 31 inside the heating tank 31. With this configuration, the steam supply unit can supply steam into the water tub 11, thereby causing wash water contained in the water tub 11 to be heated by the supplied steam. Thus, it is possible to rapidly increase the temperature of the wash water to an appropriate temperature for effective washing.

Now, the overall operation of the washing machine having the above described configuration will be described.

When the washing machine is initially operated under the condition in which laundry has been put into the rotating drum 12, and detergent has been put into the detergent supply unit 18, in order to perform a washing process, the first and second water supply valves 22 and 25 are opened under the control of a control unit (not shown), thereby causing water to be supplied to both the detergent supply unit 18 and the steam generating unit 30. At this time, the detergent contained in the detergent supply unit 18 is supplied into the water tub 11 in a state of being dissolved in the water supplied into the water tub 11 via the detergent supply unit 18. After a desired amount of water is supplied into the water tub 11 via the first water supply pipe 21, the first water supply valve 22 is closed, thereby cutting off the supply of water to the first water supply pipe 21.

Meanwhile, the steam supply valve 52 and hot water supply valve 42 at the side of the steam generating unit 30 are initially maintained in a closed state. Accordingly, the water supplied toward the steam generating unit 30 is introduced into the heating tank 31. Once the water fills the heating tank 31, the control unit controls, based on a sensing operation of the water level sensor 33, the second supply valve 25 to be opened or closed such that the water in the heating tank 31 is maintained at a desired level. In this state, the control unit drives the heater 32 to heat the water in the heating tank 31.

When the water in the heating tank 31 is heated to a predetermined temperature of about 30° C. in accordance with the heating operation of the heater 32, the control unit controls the hot water supply valve 42 to be opened, so that hot water from the heating tank 31 is supplied into the water tub 11 via the rotating drum 12. When the control unit senses, based on a sensing operation of the temperature sensor 34, that the temperature of the water in the heating tank 31 has reached the predetermined temperature, that is, 30° C., it opens the hot water supply valve 42, thereby causing the hot water to be supplied to the water tub 11 via the rotating drum 12. On the other hand, when the control unit senses, based on the sensing operation of the water level sensor 33, an excessive lowering of the water level in the heating tank 31 caused by the supply of hot water, it controls the second water supply valve 25 to be opened. Thus, the water level in the heating tank 31 is maintained at a desired level. As the above control operations are repeatedly carried out, hot water is continuously supplied into the water tub 11 via the rotating drum 12.

Once an appropriate amount of hot water, required for a washing process, is supplied into the water tub 11, the hot water supply valve 42 is closed, thereby cutting off the supply of hot water. In this state, the water in the heating tank 31 is continuously heated by the heater 32, so that steam is generated. When the internal pressure of the heating tank 31 is increased to a predetermined steam supply pressure in accordance with the generation of steam, the control unit senses this state through the pressure sensor 35, and opens the steam supply valve 52 to supply steam into the water tub 11. Accordingly, the wash water contained in the water tub 11 is heated by the steam. During such a steam supplying operation, the control unit controls the supply of steam into the water tub 11 by controlling the steam supply valve 52 in such a manner that the steam supply valve 52 is closed when the internal pressure of the heating tank 31 is excessively lowered, while being opened when the internal pressure of the heating tank 31 is excessively increased. When the water level in the heating tank 31 is excessively lowered during the steam supplying operation, the control unit also opens the second water supply valve 25 so as to supply water into the heating tank 31. This steam supplying operation is continued until the temperature of the wash water in the water tub 11 reaches a predetermined temperature for effective washing. For example, where the predetermined wash temperature is 60° C., the steam supplying operation is continued until the water in the water tub 11, which is maintained at about 30° C. by virtue of the hot water supplied into the water tub 11 via the rotating drum 12, is increased in temperature to 60° C. as it is heated by the supplied stem. The water level and water temperature in the water tub 11 are sensed by an additional water level sensor and an additional water temperature sensor, which are not shown.

Since water is supplied into the water tub 11 via the rotating drum 12 in a state of being heated by the heater 32 of the steam generating unit 30, and the resultant hot water received in the water tub 11 is again heated by steam supplied into the water tub 11 via the rotating drum 12, in accordance with the present invention, it is possible to rapidly increase the temperature of wash water, and thus, to reduce the overall wash time, as compared to conventional washing machines in which wash water is heated by a heater installed at a wash tub.

Once the wash water is heated to the predetermined wash temperature by the steam supplied into the water tub 11, the supply of steam is cut off. In this state, the rotating drum 12 performs a washing operation while being rotated at low speed in accordance with operation of the motor 15. After completion of the washing process, a rinsing process involving repetition of spin-drying and water supplying operations is carried out. The supply of water into the water tub 11 in the rinsing process is carried out through the first water supply pipe 21 in an opened state of the first water supply valve 22. During the spin-drying operation, drainage of water from the water tub 11 is carried out in accordance with operation of the drainage pump 19c in an opened state of the drainage valve 19b. After the rinsing process, a spin-drying process is carried out. In the spin-drying process, the drainage pump 19c is operated in the opened state of the drainage valve 19b. In this state, the rotating drum 12 is rotated at high speed for a predetermined time, thereby spin-drying the laundry.

As apparent from the above description, the present invention provides a washing machine in which water is supplied into a water tub in a state of being heated by a heater included in a steam generating unit, and steam generated from the steam generating unit is also supplied into the water tub to heat the wash water in the water tub to a desired wash temperature. Accordingly, the washing machine of the present invention can rapidly increase the temperature of wash water, thereby reducing the overall wash time, as compared to conventional washing machines.

In the washing machine of the present invention, it is unnecessary to provide a space for installation of a separate heater at the lower portion of the water tub, as compared to conventional washing machines. Accordingly, the amount of wash water to fill the water tub is reduced by an amount of water to fill the space. Thus, it is possible to reduce the amount of wash water to be used, and to reduce the energy consumed to heat the wash water.

Although exemplary embodiments of the invention have been disclosed for illustrative purposes, those skilled in the art will appreciate that various modifications, additions and substitutions are possible, without departing from the scope and spirit of the invention as set forth in the accompanying claims.

What is claimed is:

1. A washing machine comprising:
    a water tub for containing wash water;
    a steam generating unit which heats water supplied thereto, thereby generating steam;
    a water supply unit which supplies water into the water tub and the steam generating unit;
    a steam supply unit which supplies the steam generated from the steam generating unit into the water tub, wherein the steam supply unit comprises a steam supply pipe for guiding the steam from the steam generating unit into the water tub; and
    a hot water supply unit which supplies hot water from the steam generating unit into the water tub, wherein the hot water supply unit comprises a hot water supply pipe for guiding the hot water from the steam generating unit into the water tub.

2. The washing machine according to claim 1, wherein the steam generating unit comprises:
    a heating tank having a sealed container structure to contain a predetermined amount of water, the heating tank being connected to the water, steam and hot water supply units; and
    a heater which heats the water contained in the heating tank.

3. The washing machine according to claim 2, wherein the steam generating unit further comprises:
    a water level sensor which senses a water level in the heating tank;
    a temperature sensor which senses an internal temperature of the heating tank; and
    a pressure sensor which senses an internal pressure of the heating tank.

4. The washing machine according to claim 3, wherein the water supply unit comprises:
    a first water supply pipe for supplying water into the water tub;
    a first water supply valve for controlling the supply of water of the first water supply pipe;
    a second water supply pipe for supplying water into the heating tank; and
    a second water supply valve for controlling the supply of water of the second water supply pipe.

5. The washing machine according to claim 3, wherein the steam supply unit further comprises:
    a steam supply valve for controlling supply of the steam into the steam supply pipe.

6. The washing machine according to claim 3, wherein the hot water supply unit further comprises:
    a hot water supply valve for controlling supply of the hot water into the hot water supply pipe.

7. The washing machine according to claim 2, wherein the water supply unit comprises:
    a first water supply pipe for supplying water into the water tub;
    a first water supply valve for controlling the supply of water of the first water supply pipe;
    a second water supply pipe for supplying water into the heating tank; and
    a second water supply valve for controlling the supply of water of the second water supply pipe.

8. The washing machine according to claim 7, further comprising:
    a detergent supply unit adapted to contain detergent to be supplied, the detergent supplying unit being arranged at a portion of the first water supply pipe such that the detergent contained therein is supplied along with the water supplied through the first water supply pipe.

9. The washing machine according to claim 2, wherein the steam supply unit further comprises:
    a steam supply valve for controlling supply of the steam into the steam supply pipe.

10. The washing machine according to claim 9, wherein the steam supply pipe extends into the heating tank such that an inlet thereof is positioned at an upper portion of the heating tank, inside the heating tank.

11. The washing machine according to claim 2, wherein the hot water supply unit further comprises:
    a hot water supply valve for controlling supply of the hot water into the hot water supply pipe.

12. The washing machine according to claim 1, further comprising:
    a rotating drum rotatably mounted in the water tub while having, at a front wall thereof, an access opening to be forwardly opened, the rotating drum being provided, at a peripheral wall thereof, with a plurality of through-holes; and
    a driving unit which drives the rotating drum.

13. A washing machine comprising:
    a water tub for containing wash water;
    a steam generating unit which heats water supplied thereto, thereby generating steam and hot water, the steam generating unit including a heating tank for containing a predetermined amount of water, and a heater for heating the water contained in the heating tank;
    a water supply unit which supplies water into the water tub and the heating tank;
    a hot water supply pipe which guides the hot water from the heating tank into the water tub;
    a hot water supply valve which opens and closes the hot water supply pipe;
    a steam supply pipe which guides the steam from the steam generating unit into the water tub; and
    a steam supply valve which opens and closes the steam supply pipe.

14. The washing machine according to claim 13, wherein the steam generating unit further includes:
    a water level sensor for sensing a water level in the heating tank;
    a temperature sensor for sensing an internal temperature of the heating tank; and
    a pressure sensor for sensing an internal pressure of the heating tank.

* * * * *